United States Patent [19]
Ost et al.

[11] 3,717,709
[45] Feb. 20, 1973

[54] FUNGICIDAL AND ACARICIDAL COMPOSITION AND METHOD OF USE

[75] Inventors: Walter Ost; Klaus Thomas; Dietrich Jerchel, all of Ingelheim, Rhine; Karl-Richard Appel, Biberach-Rissegg, all of Germany

[73] Assignee: C. H. Brehrenger Sohn, Ingelheim, Rhine, Germany

[22] Filed: July 1, 1971

[21] Appl. No.: 159,030

Related U.S. Application Data

[63] Continuation-in-part of Ser. No. 793,187, Jan. 22, 1969, Pat. No. 3,595,916.

Jan. 23, 1968 Austria............................a674/68
May 17, 1968 Austria............................a4795/68

[52] U.S. Cl..................................................424/250
[51] Int. Cl. ................................................A01n 5/00
[58] Field of Search...................424/250; 260/268 R

[56] References Cited

UNITED STATES PATENTS 3,185,693   4/1965   Dunbar..............................424/250

*Primary Examiner*—Albert T. Meyers
*Assistant Examiner*—Norman A. Drezin
*Attorney*—Hammond & Littell

[57] ABSTRACT

Biocidal compositions containing as an active ingredient the compound of the formula

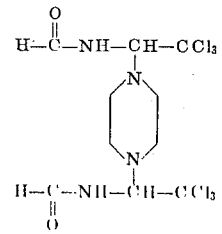

the compositions are useful for combatting fungi, helminths and acarids.

2 Claims, No Drawings

FUNGICIDAL AND ACARICIDAL COMPOSITION AND METHOD OF USE

This is a continuation-in-part of copending application Ser. No. 793,187, filed Jan. 22, 1969, now U.S. Pat. No. 3,595,916.

This invention relates to novel biocidal agricultural compositions and to a novel method of combatting fungi, helminths and acarids therewith.

More particularly, the present invention relates to novel biocidal compositions containing as an active ingredient N,N'-bis-[(1-formamido-2,2,2-trichloro)-ethyl]piperazine of the formula

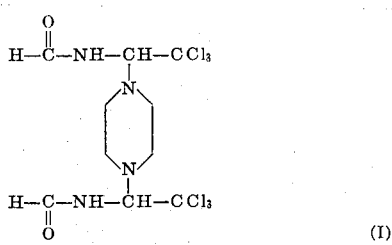

The compound of the formula I may be prepared by methods involving well known chemical principles, among which the following has proved to be particularly convenient and efficient:

By reacting a compound of the formula

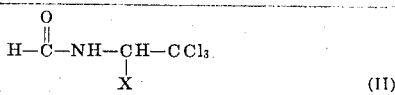

wherein X is a substituent which may easily be split off in the form of an anion, such as chlorine, bromine, arylsulfonyloxy, alkylsulfonyloxy, aryloxy, trifluoroacetoxy or arylcarbonyloxy, with piperazine, pursuant to the following reaction formula

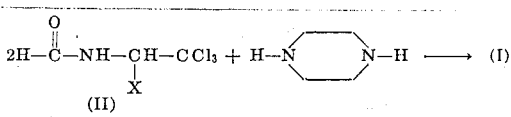

The reaction is preferably carried out in the presence of an inert organic solvent, such as tetrahydrofuran, dioxane, toluene, acetone or a chlorinated hydrocarbon, at a temperature between about −20° and +100° C., preferably between +20° and +40°C.

When X in formula II is chlorine or bromine it is advantageous to add to the reaction mixture an equivalent amount of a tertiary amine, such as triethylamine. In those instances it is assumed that a reactive intermediate of the formula H—CO—N=CH—CCl₃ is formed, which then reacts further to undergo an addition reaction with the piperazine and forms a compound of the formula I.

The end product of the formula I thus obtained is a weak base; it is a colorless crystalline solid, sparsely soluble in water, but relatively easily soluble in dimethylsulfoxide, tetrahydrofuran, cyclohexanone, dimethylformamide, N-methyl-pyrrolidone and butyrolactone.

The starting compound of the formula II may be prepared pursuant to known processes, such as by exchange of the hydroxyl group in a compound of the formula H—CO—NH—CHOH—CCl₃ for a substituent X, as defined in connection with formula II above.

The following examples further illustrate the present invention and will enable others skilled in the art to understand it more completely. It should be understood, however, that the invention is not limited solely to the particular examples given below.

EXAMPLE 1

Preparation of N,N'-bis-[(1-formamido-2,2,2-trichloro)-ethyl]-piperazine

While stirring, a solution of 4.3 gm (0.05 mol) of piperazine and 10.5 gm (0.104 mol) of triethylamine in 70 cc of acetone was added dropwise to a solution of 21.1 gm (0.1 mol) of (1,2,2,2-tetrachloro-ethyl)-formamide in 30 cc of acetone. Thereafter, the reaction mixture was allowed to stand at room temperature, and then the precipitate consisting of the reaction product and triethylamine hydrochloride was separated by vacuum filtration, thoroughly washed first with water and then with cold methanol and finally dried at 40°C., yielding a colorless crystalline powder having a decomposition point of about 175°C. (depending upon the rate of heating), which was identified to be N,N'-bis-[(1-formamido-2,2,2,-trichloro)-ethyl]-piperazine.

A second fraction of this compound was obtained by evaporation of the acetonic mother liquor and washing of the residue with cold methanol. The total yield was 18.7 gm (86 percent of theory). The product was recrystallizable from dioxane.

Analysis:
Calculated: C − 27.61%; H − 3.24%; N − 12.88%
Found: C − 27.90%; H − 3.38%; N − 12.68%

EXAMPLE 2

21.1 gm (0.1 mol) of powdered N-(1,2,2,2-tetrachloro-ethyl)-formamide were suspended in 50 cc of water and, while stirring, a mixture of 4.3 gm (0.05 mol) of piperazine, 10.1 gm (0.1 mol) of triethylamine and 50 cc of water was added dropwise to the suspension at 20°−25°C. Thereafter, the reaction mixture was stirred for 30 minutes more at room temperature, the aqueous phase was decanted, and the tacky crystalline residue was digested with 30 cc of methanol, vacuum filtered, and washed with methanol. 50 percent of theory of N,N'-bis-[(1-formamido-2,2,2-trichloro-ethyl]-piperazine was obtained.

EXAMPLE 3

5.3 gm (0.05 mol) of sodium carbonate were added to a solution of 21.1 gm (0.1 mol) of N-(1,2,2,2-tetrachloro-ethyl)-formamide in 50 cc of acetone, and then, while stirring, a solution of 4.3 gm (0.05 mol) of piperazine in 50 cc of acetone was added dropwise. Thereafter, the reaction mixture was stirred for 30 minutes more, the acetone was distilled off in vacuo, and the residue was washed first with water and then with cold methanol and finally dried. The yield was 77 percent of theory of N,N'-bis-[(1-formamido-2,2,2-trichloro)-ethyl]-piperazine.

EXAMPLE 4

A mixture consisting of 2.1 gm (0.025 mol) of piperazine, 5.1 gm (0.05 mol) of triethylamine, 6.8 gm (0.05 mol) of [(1-formamido-2,2,2-trichloro)-ethoxy]-benzene and 50 cc of absolute tetrahydrofuran was allowed to stand for 14 hours at room temperature, and thereafter was refluxed for 2 hours. Subsequently, the reaction solution was filtered, the filtrate was evaporated in vacuo, and the viscous brown residue, which had an odor of phenol, was digested with 15 cc of methanol. After several hours of standing, about 10 percent of theory of N,N'-bis-[(1-formamido-2,2,2-trichloro)-ethyl]-piperazine had crystallized out.

The starting compound, [(1-formamido-2,2,2-trichloro)-ethoxyl]-benzene, m. p. 93°– 94°C., was obtained with a yield of 83 percent of theory from N-[(1,2,2,2-tetrachloro)-ethyl]-formamide and phenol in the presence of triethylamine.

1.2 gm (0.014 mol) of piperazine and 7.1 gm (0.028 mol) of [1-formamido-1-(methylsulfonyl)-2,2,2-trichloro]-ethane were dissolved in 50 cc of absolute tetrahydrofuran, 2.9 gm (0.028 mol) of triethylamine were added to the solution, and the mixture was allowed to stand for several hours at room temperature. Thereafter, the reaction solution was diluted with water, and the precipitate formed thereby was collected by vacuum filtration and washed first with water and then with methanol. 96 percent of theory of N,N'-bis-[(1-formamido-2,2,2-trichloro)-ethyl]-piperazine were obtained.

The starting compound, [1-formamido-1-(methylsulfonyl)-2,2,2-trichloro]-ethane, m. p. 132°–133°C., was prepared in the following manner: N-[(1,2,2,2-tetrachloro)-ethyl]-formamide was first reacted with methylmercaptan in the presence of triethylamine, yielding 82 percent of theory of (1-formamido-1-methylmercapto-2,2,2-trichloro)-ethane, m. p. 122°–123°C., which was subsequently oxidized with hydrogen peroxide in acetic acid at 20°C. The yield was 66 percent of theory.

The compound of the formula I above has useful properties. More particularly, it is a highly effective broad-spectrum fungicide with very low phyto-toxicity; thus it may be effectively used for prophylactic as well as curative treatment of plants against a wide variety of phytopathogenic fungi. For instance, the compound exhibits fungitoxic activities against genuine mildew fungi, such as *Erysiphe graminis, Erysiphe polygoni, Erysiphe cichoracearum, Sphaerotheca pannosa, Podosphaera leucotricha, Oidium fragariae, Oidium tuckeri, Sphaeroteca mors uvae,* and *Sphaerotheca fusca;* against imperfect mildew fungi, such as *Septoria apii, Cercospora beticola* and *Cercospora rosae;* against imperfect gray mildew fungi, such as *Botrytis cinerea;* against rust fungi, such as *Uromyces fabae, Puccinia arenariae, Puccinia pelargonii, Phragmidium mucronatum* and *Puccinia recondita;* against *Marssonina rosae;* against causes of wilting diseases, such as *Verticillium alboatrum;* against causes of plant scabs, such as *Venturia inaequalis;* against mold fungi, such as *Aspergillus niger;* and various other harmful fungi, such as *Fusaria spec., Ophiobuli, Claviceps purpurea* and *Gloetinia temulenta.*

Particularly noteworthy is the good systemic effect of the compound.

The compound of the formula I is also useful as an anthelmintic and enhances the germination of seeds, such as pea and cotton seeds.

The compound of the formula I is, in addition, a highly effective acaricide and may thus also be effectively used for combatting infestation by harmful crustacean pests, such as aphids and weevils (e.g. *Calandra granaria*), cimeces (e.g. *Cimex lectularius*), roaches (e.g. *Phyllodroma germanica*) and spider mites (e.g. *Tetranychus urticae*).

Of particular importance is the surprisingly excellent effectiveness against spider mites; the compound evidently kills these pests in the larva stage and thereby effectively decimates the population.

The successful eradication of spider mites is of special importance in agriculture, particularly in fruit orchards and the like, because significant spider mite infestation may cause substantial harvest reductions. For this reason a number of pesticidal compositions have been developed which effectively kill spider mites. Such acaricidal compositions contain as active ingredients, for example, 2-sec.butyl-4,6-dinitrophenyl-(2-methylcrotonate) and 2,4,5,4'-tetrachloro-diphenylsulfone. A number of organic phosphoric acid esters and carbamic acid esters also exhibit significant activity against spider mites. However, after prolonged use of the known acaricides, it has frequently been observed that spider mites develop a resistance against them. The compound of the formula I and the compositions of the invention containing it are particularly effective against these resistant spider mites. The development of a resistance against the compositions of the instant invention has so far not been observed and, by virtue of their mechanism of action, is also not expected.

Agricultural and ornamental plants often become simultaneously infested with spider mites as well as phytogenic fungi, which heavily damages the affected plants and may lead to substantial losses. The causative microorganisms of the fungus infections are either completely unaffected by the known acaricidal agents or their growth is inhibited only to a minor degree. Consequently, it has heretofore been customary and, indeed, necessary to apply fungicides in addition to acaricides, often using several different active ingredients simultaneously or successively, in order to combat different, simultaneously occurring fungus diseases.

By virtue of the fact that the compound of the formula I exhibits both acaricidal and fungicidal activities at the same time, it is now possible to successfully combat a broad spectrum of phytogenic fungi and spider mites simultaneously with a biocidal composition containing a single active ingredient.

The compound of the formula I also exhibits very low toxicity toward warm-blooded animals.

For use against fungus and acarid infestation, the compound of the formula I is incorporated as an active ingredient into customary fungicidal compositions, i.e. compositions consisting essentially of a liquid or comminuted solid inert carrier and an effective fungicidal and acaricidal amount of the active ingredient, such as solutions, emulsion concentrates, suspendable or wettable powders, dusting powders, granulates and sprays. The active ingredient content of these compositions is about 0.05 to 85 percent by weight, preferably 0.5 to 50 percent by weight.

For instance, an emulsion concentrate contains about 0.5 to 20 percent by weight, preferably 5 to 10 percent by weight, of the compound of the formula I. Suitable solvents for the preparation of emulsion concentrates comprising the compound of the formula I as an active ingredient are, for example, mixtures of dimethylformamide or N-methylpyrrolidone with alcohols or glycols. Suitable emulsifiers and wetting agents which may be used for the preparation of such emulsion concentrates are non-ionic compounds, such as nonylphenol polyglycol ether, or mixtures of non-ionic and ionic, preferably anionic, compounds as well as ampholytes. The emulsifier content of the emulsion concentrate is about 0.5 to 45 percent by weight, preferably 5 to 25 percent by weight.

The active ingredient content of a wettable powder is about 0.5 to 80 percent by weight, preferably 20 to 60 percent by weight. Suitable emulsifiers and wetting agents which may be used for the preparation of wettable powders are non-ionic or ionic compounds of the type described in the preceding paragraph; the total amount of emulsifier and wetting agent in such wettable powders is about 0.5 to 25 percent by weight, preferably 2 to 25 percent by weight. Suitable powdery inert carriers are, for example, bentonite, kaolin and colloidal silicic acid.

The fungicidal and acaricidal compositions of the present invention are, if necessary, diluted with water to an active ingredient concentration of 0.5 to 0.0001 percent prior to their use for combatting fungi and acarids. Dusting powders may have a higher active ingredient concentration. The upper limit for the application concentration is predicated upon the relatively low phytotoxicity.

The following examples illustrate a few fungicidal and acaricidal compositions comprising a compound of the instant invention as an active ingredient and represent the best mode contemplated of putting the invention to practical use. The percentages are percent by weight.

EXAMPLE 6

Dusting Powder

| | |
|---|---|
| N,N'-Bis-[(1-formamido-2,2,2-trichloro)-ethyl]-piperazine | 1% |
| Talcum | 98% |
| Methylcellulose | 1% |

The components are admixed with each other, and the mixture is milled until homogeneous.

EXAMPLE 7

Wettable Powder

| | | |
|---|---|---|
| (a) | N,N'-Bis-[(1-formamido 2,2,2 trichloro)-ethyl]-piperazine | 25% |
| | Kaolin | 55% |
| | Colloidal silicic acid | 10% |
| | Lignin sulfonate (dispersing agent) | 9% |
| | Sodium tetrapropylene benzene sulfonate (wetting agent) | 1% |
| or (b) | N,N'-Bis-[(1formamido-2,2,2-trichloro)-ethyl]-piperazine | 80% |
| | Colloidal Silicic acid | 5% |
| | Sodium lignin sulfonate | 5 |
| | Sodium diisobutylnaphthalene sulfonate | 1% |
| | Urea | 9% |

The components are admixed, the mixture is milled until homogeneous, and prior to use the powder is suspended in an amount of water such that the active ingredient concentration in the aqueous suspension is from 0.0001 to 0.5 percent by weight.

EXAMPLE 8

Emulsion Concentrate

| | |
|---|---|
| N,N,'-Bis-[(1-formamido-2,2,2-trichloro)-ethyl]-piperazine | 10% |
| Sodium tetrapropylene benzene Sulfonate (anionic emulsifier) | 5% |
| Nonylphenol polyglycol ether (non-ionic emulsifier) | 20% |
| Propyleneglycol | 32.5% |
| N-Methylpyrrolidone | 32.5% |

The components are uniformly admixed with each other, and prior to use the resulting concentrate is diluted with water to the desired active ingredient content between 0.0001 and 0.5 percent by weight.

EXAMPLE 9

Aerosol Spray

| | | |
|---|---|---|
| (a) | N,N'Bis-[(1-formamido-2,2,2-trichloro)-ethyl]-piperazine | 0.05% |
| | Sesame oil | 0.10% |
| | N-Methylpyrrolidon | 10.00% |
| | Propellant gas | 89.85% |
| or (b) | N,N'-Bis-[(1-formamido-2,2,2-trichloro)-ethyl]-piperazine | 0.1% |
| | Ethanolamine salt of dodecyl-benzenesulfonic acid | 0.5% |
| | N-Methylpyrrolidone | 10.0% |
| | Propellant gas | 88.5% |

The components are admixed in customary fashion, and the mixture is charged into aerosol containers provided with a spray valve.

EXAMPLE 10

Water-soluble Concentrate

| | |
|---|---|
| N,N'-Bis-[(1-formamido-2,2,2-trichloro)-ethyl]-piperazine | 20% |
| Ethanolamine salt of dodecyl-benzene sulfonic acid | 20% |
| Dimethylformamide | 64% |

The ingredients are intimately admixed with each other, and prior to use the resulting concentrate is dissolved in an amount of water such that the active ingredient concentration in the aqueous solution is between 0.0001 and 0.5 percent by weight.

EXAMPLE 11

Ultra-low-volume Concentrate

| | |
|---|---|
| N,N'-Bis-[(1-formamido-2,2,2-trichloro)-ethyl]-piperazine | 18% |
| Triethyleneglycol | 30% |
| N-Methylpyrrolidone | 44% |
| Condensation product of 1 mol of nonylphenol with 5 mols of ethyleneoxide | 8% |

While the present invention has been illustrated with the aid of certain specific embodiments thereof, it will be readily apparent to others skilled in the art that the invention is not limited to these particular embodiments, and that various changes and modifications may be made without departing from the spirit of the invention.

We claim:

1. A fungicidal and acaricidal composition consisting essentially of inert carrier and an effective fungicidal and acaricidal amount of N,N'-bis-[(1-formamido-2,2,2-trichloro)-ethyl]-piperazine.

2. The method of killing phytopathogenic fungi and acarids, which comprises contacting said fungi and acarids with an effective fungicidal and acaricidal amount of N,N'-bis-[(1-formamido-2,2,2-trichloro)-ethyl]-piperazine.

* * * * *

UNITED STATES PATENT OFFICE
CERTIFICATE OF CORRECTION

Patent No. 3,717,709     Dated Feb. 20, 1973

Inventor(s) WALTER OST, KLAUS THOMAS, DIETRICH JERCHEL and KARL-RICHARD APPEL

It is certified that error appears in the above-identified patent and that said Letters Patent are hereby corrected as shown below:

First Page, insert --[30] Foreign Application Priority Data
    Jan. 23, 1968   Austria   A674/68
    May 17, 1968   Austria   A4795/68
    July 3, 1970   Austria   A6026/70 --.

First Page, [73] - correct "Brehrenger" to read --Boehringer--.

Col. 3, line 16 - correct "ethoxyl]" to read --ethoxy]--.

"   " before line 20, insert --EXAMPLE 5--.

Signed and sealed this 20th day of November 1973.

(SEAL)
Attest:

EDWARD M. FLETCHER, JR.
Attesting Officer

RENE D. TEGTMEYER
Acting Commissioner of Patents